(12) United States Patent
Mitchell et al.

(10) Patent No.: US 11,230,089 B2
(45) Date of Patent: Jan. 25, 2022

(54) FACE FILM AND AN ADHESIVE LABEL COMPRISING THE FACE FILM

(71) Applicant: UPM Raflatac Oy, Tampere (FI)

(72) Inventors: Noel Mitchell, Wuppertal (DE); Klaudia Majewska, Wroclawskie (PL)

(73) Assignee: UPM RAFLATAC OY, Tampere (FI)

( * ) Notice: Subject to any disclaimer, the term of this patent is extended or adjusted under 35 U.S.C. 154(b) by 265 days.

(21) Appl. No.: 15/772,435

(22) PCT Filed: Nov. 2, 2016

(86) PCT No.: PCT/FI2016/050764
§ 371 (c)(1),
(2) Date: Apr. 30, 2018

(87) PCT Pub. No.: WO2017/077184
PCT Pub. Date: May 11, 2017

(65) Prior Publication Data
US 2018/0319141 A1    Nov. 8, 2018

(30) Foreign Application Priority Data

Nov. 2, 2015    (FI) .................................... 20155786
Dec. 14, 2015   (FI) .................................... 20155944

(51) Int. Cl.
*B32B 27/32* (2006.01)
*G09F 3/10* (2006.01)
(Continued)

(52) U.S. Cl.
CPC .............. *B32B 27/325* (2013.01); *B32B 7/06* (2013.01); *B32B 7/12* (2013.01); *B32B 27/08* (2013.01);
(Continued)

(58) Field of Classification Search
CPC ..... B32B 27/325; B32B 27/327; B32B 27/20; B32B 27/18; B32B 27/32; B32B 27/08;
(Continued)

(56) References Cited

U.S. PATENT DOCUMENTS

2008/0118718 A1   5/2008  Koike et al.
2009/0186204 A1*  7/2009  Kokel ................. B32B 27/32
                                                        428/213
(Continued)

FOREIGN PATENT DOCUMENTS

WO    2005085381    9/2005
WO    2010027507    3/2010
(Continued)

OTHER PUBLICATIONS

International Search Report for International Application No. PCT/FI2016/050764; International Filing Date: Nov. 2, 2016; Date of Mailing: ; 5 pages.
(Continued)

*Primary Examiner* — Scott R. Walshon
(74) *Attorney, Agent, or Firm* — Cantor Colburn LLP

(57) ABSTRACT

A wash-off label includes a face film. According to an embodiment the face film is at least uniaxially oriented and comprises at least one of the polyolefins: cyclic olefin copolymer, propylene terpolymer, propylene random copolymer, propylene homopolymer, heterophasic polypropylene and linear low density polyethylene. The face film has density between 0.85 and 0.94 g/cm$^3$ at room temperature (23±2° C.). Further the invention relates to a labelled item comprising the wash-off label.

18 Claims, 4 Drawing Sheets

(51) Int. Cl.
*B32B 7/06* (2019.01)
*B32B 7/12* (2006.01)
*B32B 27/08* (2006.01)
*B32B 27/20* (2006.01)
*B32B 27/18* (2006.01)

(52) U.S. Cl.
CPC .............. *B32B 27/18* (2013.01); *B32B 27/20* (2013.01); *B32B 27/32* (2013.01); *B32B 27/327* (2013.01); *G09F 3/10* (2013.01); *B32B 2250/24* (2013.01); *B32B 2250/242* (2013.01); *B32B 2255/10* (2013.01); *B32B 2255/26* (2013.01); *B32B 2270/00* (2013.01); *B32B 2307/516* (2013.01); *B32B 2307/518* (2013.01); *B32B 2307/7166* (2013.01); *B32B 2307/72* (2013.01); *B32B 2307/732* (2013.01); *B32B 2307/736* (2013.01); *B32B 2307/748* (2013.01); *B32B 2323/046* (2013.01); *B32B 2323/10* (2013.01); *B32B 2439/60* (2013.01); *B32B 2519/00* (2013.01)

(58) Field of Classification Search
CPC ....... B32B 7/06; B32B 7/12; B32B 2307/518; B32B 2307/732; B32B 2250/24; B32B 2270/00; B32B 2323/046; B32B 2323/10; B32B 2250/242; B32B 2255/10; B32B 2255/26; B32B 2307/546; B32B 2307/72; B32B 2307/478; B32B 2439/60; B32B 2519/00; G09F 3/10
See application file for complete search history.

(56) References Cited

U.S. PATENT DOCUMENTS

| | | |
|---|---|---|
| 2010/0139707 A1 | 6/2010 | Boonstra et al. |
| 2011/0268979 A1* | 11/2011 | Ambroise ............... C08L 23/04 428/516 |
| 2012/0052273 A1* | 3/2012 | Arroyo Villan ........ B32B 27/16 428/213 |
| 2012/0060997 A1 | 3/2012 | Mitchell et al. |
| 2013/0008613 A1 | 1/2013 | Henderson |
| 2013/0192744 A1 | 8/2013 | Henderson |
| 2014/0134430 A1 | 5/2014 | Mitchell et al. |

FOREIGN PATENT DOCUMENTS

| | | | |
|---|---|---|---|
| WO | WO-2014013131 A1 * | 1/2014 | .......... B32B 27/302 |
| WO | 2015004310 A1 | 1/2015 | |
| WO | 2015004314 A1 | 1/2015 | |
| WO | 2015118212 A1 | 8/2015 | |

OTHER PUBLICATIONS

Tekra Tek Tip, "Density vs. Specific Gravity"; Downloaded from https://www.tekra.com/resources/tek-tip-white-paper/tek-tip-defining-density-vs-specific-gravity on Apr. 27, 2018; 2 pages.
Written Opinion of the International Searching Authority for International Application No. PCT/FI2016/050764; International Filing Date: Nov. 2, 2016; Date of Mailing: ;5 pages.

* cited by examiner

FACE FILM AND AN ADHESIVE LABEL COMPRISING THE FACE FILM

CROSS-REFERENCE TO RELATED APPLICATIONS

This application is a National Stage application of PCT/FI2016/050764, filed Nov. 2, 2016, which claims the benefit of Finnish Patent Application No. 20155786, filed Nov. 2, 2015, and Finnish Patent Application No. 20155944, filed Dec. 14, 2015, each of which are incorporated by reference herein in their entirety.

TECHNICAL FIELD

The present application relates to films for labels and especially to films for labels removable from the surface of an item labelled during subsequent washing process.

BACKGROUND

It is general practice to apply a label to the surface of containers, such as bottles made of polymer or glass, to provide decoration, identification and/or information, for example, on the contents of the container. The use of polymer containers, for example bottles made of thermoplastic polymers, has been increasing. One of the most popular polymer for used in bottles is polyethylene terephthalate (PET). The containers, such as bottles in the beverage industry, are generally re-used or recycled and thus there is a need for labels which are easily removed from the surface of the container during conventional washing processes such as hot dilute caustic soda. Especially there is an interest make the recycling of polymeric containers for more efficient and cost effective. Thus, removable labels are an important topic, for example, in beverage industry.

It would be desirable to produce labels which are economical but also environmentally friendly. Further it would be desirable that the labels are removable from a surface of an item but also separable in the normal sink-float washing process allowing efficient recycling of the item. As an example, remnants or deposits of labels, such as adhesive, print ink and label face, may interfere the recycling process of PET. Remnants may cause problems with colour, clarity and processability of the recycled PET.

SUMMARY

It is an aim to provide films for labels and labels which facilitate their removal from articles under conventional washing conditions.

According to an embodiment a face film for a wash-off label is provided. The face film is at least uniaxially oriented having an orientation direction and the face film comprises at least one of the following polyolefins: cyclic olefin copolymer, propylene terpolymer, propylene random copolymer, propylene homopolymer, heterophasic polypropylene and linear low density polyethylene. The face film has density between 0.85 and 0.94 g/cm³ at room temperature (23±2° C.).

According to an embodiment, use of a face film is provided. The face film is used for providing a wash-off label comprising the face film and an adhesive layer at the surface of the face film for adhering the wash-off label to the surface of an item.

According to an embodiment, a wash-off label detaching from the surface labelled at the washing conditions comprising alkaline aqueous solution having temperature in the range of 60-90° C. is provided. The wash-off label comprises a face film comprising at least one of the following polyolefins: cyclic olefin copolymer, propylene terpolymer, propylene random copolymer, propylene homopolymer, heterophasic polypropylene and linear low density polyethylene and the face film has density between 0.85 and 0.94 g/cm³ at room temperature (23±2° C.).

According to an embodiment a labelled item comprising an item and a wash-off label is provided.

Further embodiments of the application are presented in dependent claims.

According to an example, the face film has a multilayer structure comprising layers in the following order: a first skin layer, a core layer and a second skin layer.

According to an example, the core layer has a thickness between 60 and 85% from the total thickness of the face film.

According to an example, the core layer comprises at least one of the following polyolefins: propylene homopolymer, propylene terpolymer, heterophasic polypropylene and propylene random copolymer; and at least one of the following modifiers: polyolefin plastomer, polyolefin elastomer, EBA and OBC.

According to an example, the total amount of the polyolefin(s) is between 50 and 90 wt. % and the total amount of the modifier(s) is between 10 and 50 wt. % in the core layer.

According to an example, the first skin layer comprises at least one of the following polyolefins: cyclic olefin copolymer, propylene terpolymer, propylene random copolymer, propylene homopolymer, heterophasic polypropylene and linear low density polyethylene.

According to an example, the total amount of the polyolefin(s) in the first skin layer is between 80 and 99 wt. %.

According to an example, the second skin layer comprises at least one of the following polyolefins: cyclic olefin copolymer, propylene terpolymer, propylene random copolymer, propylene homopolymer, heterophasic polypropylene and linear low density polyethylene.

According to an example, the total amount of the polyolefin(s) in the second skin layer is between 80 and 99 wt. %.

According to an example, the face film exhibits less than 10% shrinkage at 60° C. in the orientation direction of the face film.

According to an example, the face film exhibits shrinkage between 5 and 70% at 80° C. in the orientation direction of the face film.

According to an example, the face film exhibits maximum shrink force of between 2 and 14 N/15 mm at temperature range of 65–90° C. in the orientation direction of the face film, when measured according to standard DIN 53369.

According to an example, the face film exhibits no more than 50% of the maximum shrink force at temperature of 50° C.

According to an example, the face film exhibits maximum shrink force at least 0.83 N for defined surface area 0.6 mm² (+/−10%) at 70° C., when measured according to standard ISO 14616 in the orientation direction of the face film.

According to an example, the face film exhibits maximum shrink force at least 1.65 N for defined surface area 0.6 mm² (+/−10%) at 90° C., when measured according to standard ISO 14616 in the orientation direction of the face film.

According to an example, the face film exhibits shrink stress between 2.5 and 10 N/mm², when measured according to AWATM #2.1.2 method at temperature of 90° C. in the orientation direction of the face film.

According to an example, the face film is uniaxially oriented in a machine direction and has a stretching ratio between 2 and 10 in the machine direction.

According to an example, the wash-off label exhibits total density below the density of the alkaline aqueous solution.

According to an example, the labelled item is polyethylene terephthalate bottle.

BRIEF DESCRIPTION OF THE DRAWINGS

In the following some examples and embodiments will be described in more detail with reference to appended drawings, in which.

DETAILED DESCRIPTION

Figure 1:
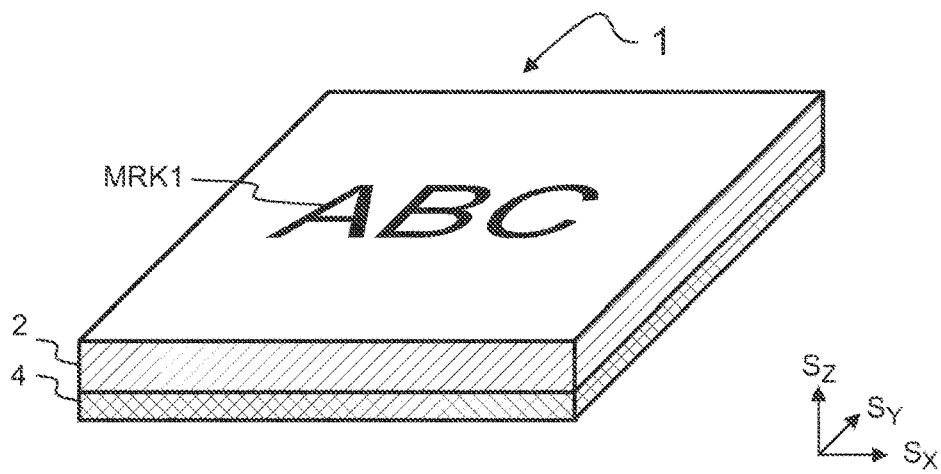
FIG. 1 shows, in a 3D view, an example embodiment of a label.

In this description and claims, the percentage values relating to an amount of raw materials are percentages by dry weight (wt. %) unless otherwise indicated. Word "comprising" may be used as an open term, but it also comprises the closed term "consisting of". Unit of thickness expressed as microns corresponds to µm. Unit of temperature expressed as degrees C. corresponds to ° C. The following reference numbers and denotations are used in this application:

| MRK1 | graphics, |
|---|---|
| Sx, Sy, Sz | 3D coordinates, |
| 1 | a label, |
| 2 | a face film, |
| 4 | an adhesive layer, |
| 6 | a release liner, |
| 8 | a label laminate structure, |
| 10 | a backing material (substrate) |
| 12 | a release coating, |
| 14 | a first skin layer of a multilayer face film, |
| 16 | a core layer of a multilayer face film, |
| 18 | a second skin layer of a multilayer face film, |
| 100 | an item, |
| 101 | a labelled item. |

Term "label" refers to a piece of material carrying information and to be applied onto items of different shapes and materials. In the application an item is also called as an article. An item may be a package, such as a bottle. A label comprises at least a face layer. Usually the label comprises also an adhesive layer. A label comprising an adhesive layer of pressure sensitive adhesive may be referred to as a pressure sensitive adhesive (PSA) label. Pressure sensitive adhesive labels may also be referred to as self-adhesive labels. The labels consisting of PSA can be adhered to most surfaces through an adhesive layer without the use of a secondary agent, such as a solvent, or heat to strengthen the bond. The PSA forms a bond when pressure is applied onto the label at ambient temperature (e.g. between 15 and 35° C.), adhering the label to the item to be labelled. Examples of pressure sensitive adhesives include water based (waterborne) PSAs, solvent based PSAs and solid PSAs. Solid PSAs are melted during application to the surface to be coated and may also be referred to as a hot-melt PSAs. A label may further comprise other adhesive(s).

Term "wash-off label", also referred to as a washable label, refers to a label removable (detachable) from the surface of the item attached during subsequent washing process. At washing conditions comprising elevated temperatures, the adhesive bond between the label and the item the label is adhered to is weakened. The chemical effect of the washing solution may further promote the weakening of the adhesion. A wash-off label may comprise an adhesive layer sensitive to washing conditions. Wash-off labels may be used in labelling of beverage bottles. For example, beer and wine bottles, such as polyethylene terephthalate (PET) bottles and glass bottles.

As an example, a label laminate comprises a face film (also referred to as a facestock or a face layer), a PSA layer, and further a release liner. The face film and the release liner are typically laminated together having an adhesive layer in between, which laminated structure is referred to as a label laminate. The release liner is used to protect the adhesive layer. It also allows easier handling of the label to up to the point of labelling where the label face layer is dispensed and adhered to a surface of an item. In labelling the release liner is removed and disposed of. Thus, release liners of the label laminates serve one or more useful functions: they are used as a carrier sheet onto which the adhesive may be coated; they protect the adhesive layer during storage and transportation; they provide a support for labels during die-cutting and printing, and ultimately they release from the adhesive leaving it undamaged.

Labels may be used in wide variety of labelling applications and end-use areas, such as beverage labelling, food labelling, home and personal care product labelling, and labelling of industrial products. The surface of the labelled article may be for example plastic, glass, metal, or paper based. The labelled article may be for example a container, such as a bottle, jar, canister, can, tin or the like. The label may also be applied to semi-rigid or flexible packages used for e.g. packaging of food. Examples of articles include glass bottles, metal bottles, polyethylene terephthalate (PET) bottles, and bottles made of polyolefin, such as high density polyethylene (HDPE) and polypropylene (PP). The label may surround the labelled article, such as a bottle, completely or partially.

Term "face film" refers to a top layer of the label, also called as a face stock, a face material layer, or a face layer. The face film 2 is the layer that is adhered to the surface of an item 100 during labelling through an adhesive layer 4. The face film may comprise e.g. printing in order to provide information and/or visual effect, such as information of the content of the item labelled. Printable face film is suitable for printing by any of the known printing methods, such as with gravure, flexographic process, offset, screen or letterpress or digital printing. The face film may also contain special decoration or visual effects made by metallic, or metallic like layers. These can be applied, for example, via cold or hot foil printing methods. The printing may exist on a top surface, reverse side or both top and reverse side of the face film. The printing may further require use of pre- or after treatments, such as primers or coatings, which can affect the weight of the label and therefore also the total density of the label. A label consisting of a face film, printing layer and an adhesive layer may be referred to as "a printed label". The face film may have a monolayer or multilayer structure.

Figure 2:
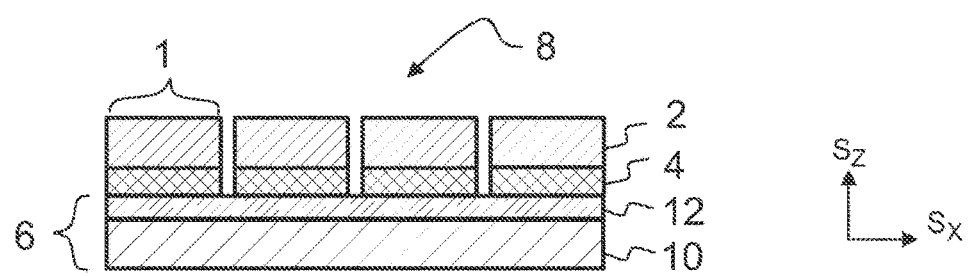
FIG. 2 shows, in a cross sectional view, cut labels attached to a common release liner.

Term "release liner" 6 refers to a structure comprising a backing material layer 10 as a substrate and a release coating layer 12 on a surface of the substrate, as shown in FIG. 2. In other words, the backing material 10 is usually coated with a thin layer of release agent, such as silicone. The release coating layer provides a non-adherent surface i.e. low adhesion and release effect against the adhesive layer. The release liner protects the adhesive layer during shipment and storage. It further allows for efficient handling of individual labels after the labels are die-cut and the surrounding matrix is stripped up to the point where the individual labels are dispensed on a labelling line. During dispensing the liner is peeled off and discarded.

Term "shrinkable" refers to a property of a face film and a label made thereof to shrink under exposure to external energy, such as heat. External energy may be provided in the form of heated washing liquid. Shrinkable film is extruded and stretched (hot drawn) during manufacture and it remains its state after cooling down i.e. internal stresses provided during stretching are locked into the film. When this film is again brought up to the elevated temperature at which the stress was induced and then fixed during its manufacture, this stress is released and the film shrinks back. Depending on the treatment applied, the film can be shrinkable both lengthwise and crosswise (film is called biaxially oriented), or mainly shrinkable in one direction (film is called uniaxially oriented).

Term "shrink force" (N/15 mm) refers to force developed by the film when exposed to elevated temperature. In an example, shrink force (shrink stress) determination is based on standard DIN 53369. The test sample is attached to a load cell and placed in a heating chamber, such as a hot oven, for heating and subsequently cooled down. Heating rate is 120 K/h, start temperature 30° C., maximum temperature 100° C. and final temperature 30° C. The force that is build up during the shrinking of the material is recorded. Maximum shrink force refers to the maximum force received during heating of the film. Alternatively or in addition shrink force can be measured according to standard ISO 14616 and according to modified AWATM #2.1.2 test method.

Term "machine direction" MD refers to the running direction Sx of the face film or continuous label laminate during label manufacturing. "Transverse direction" TD or "cross direction" CD refers to the direction Sy perpendicular to the running direction Sx of the face film or label laminate.

A ratio of total film thickness before and after stretching (orientation) is called a "stretch ratio" or "stretching ratio" (DR). It may also be referred to as a an orientation ratio. Stretch ratio is a non-oriented (undrawn) film thickness in relation to the oriented (drawn) film thickness. The non-oriented film thickness is the thickness after extrusion and subsequent chilling of the film. When stretching the film, the thickness of the film may diminish in the same ratio as the film stretches or elongates. For example, a film having thickness of 100 micrometres before uniaxial orientation is stretched by a stretch ratio of 5. After the uniaxial orientation the film may have a fivefold diminished thickness of 20 micrometres. Thus, the stretch ratio (orientation ratio) is 5. Oriented film, such as oriented face layer, may be provided, for example, by uniaxial or biaxial stretching.

Term "wash-off ability" refers to the ability of an adhesive label to detach itself in a washing procedure comprising washing solution at 65-90° C., for example at temperature of 80±2° C. In an example, the washing solution comprises 1% of sodium hydroxide (NaOH). It may further comprise 0.3% of non-ionic surfactant (Triton X-100). In an example, the washing procedure comprises total washing time of 5 to 15 minutes and non-stop stirring of around 1000 rpm. After washing procedure the amount of detached labels can be measured.

Term "printable surface" refers to a surface, such as a surface of a face film of a label, that is suitable for printing. Printable surface is also able to maintain the printing, such as printed text and/or graphics. Printable surface has sufficiently high surface energy. A low surface energy may lead to poor retaining capability of printing ink applied to the surface. For example, a face film may have a surface energy at least 36 dynes/cm, preferably at least 38 dynes/cm, or at least 44 dynes/cm measured according to the standard ASTM D-2578. The surface tension may be between 36 and 60 dynes/cm, preferably between 38 and 56 dynes/cm, or between 44 and 50 dynes/cm. The surface tension level may also be maintained higher than or equal to 38 dynes/cm after 50 or 120 days. According to an embodiment, a printable face film and a label produced thereof comprises at least one printable surface. Surface of the face film may be printable as such. Alternatively, surface of the face film may be treated prior to printing e.g. by corona unit at a printing line. For example, face film may have lower surface energy than 36 dynes/cm, but the surface is suitable for surface treatment increasing the energy prior to printing.

Overlying/underlying refers to an arrangement of a layer in relation to another layer. Overlaying/underlying refers to an arrangement, where a layer partially or completely overlies/underlies another layer. The overlying/underlying layers are not necessarily in contact with each other, but one or more additional layers may be arranged between the overlying layers.

Adjacent refers to an arrangement, where a layer is next to another layer. Adjacent layers are in contact with each other and no additional layers are between the layers.

Topmost (outermost, uppermost, upmost) layer refers to a configuration of a label structure, where the topmost layer forms upper part of the label structure arranged opposite to the surface attaching the surface of an item when labelled. Topmost layer of a label may be, for example, a first skin layer, a print layer, a first layer, or a top coating (overvanishing layer).

Undermost layer refers to a surface forming bottom part of the label structure arranged opposite to the topmost surface. Undermost layer is in contact with the surface of an article when labelled. Undermost layer of the adhesive label for labelling to an item is an adhesive layer.

Term "haze" refers to a property used to describe transparency of a plastic film or a face stock of label consisting of the plastic film. Haze relates to scattering of light by a film that results in a cloudy appearance of the film. Haze corresponds to the percentage of light transmitted through a film that is deflected from the direction of the incoming light. Haze may be measured according to standard ASTM D1003.

Label Structure

Referring to FIG. 1 a label 1 comprises a face film 2 and an adhesive layer 4. Through the adhesive layer the label is attached to an item. Further the label typically includes graphical patterns MRK1 on its face film 2. During label manufacturing, continuous face film 2 is laminated together with a release liner 6 having the adhesive layer 4 in between so as to provide a label laminate from which the individual labels can be cut. Term "label laminate" 8 refers to a continuous structure comprising a face film 2, an adhesive layer 4 and a release liner 6. Individual labels are die-cut from the continuous label laminate. Referring to FIG. 2, a label laminate structure 8 comprises four cut labels 1 attached to a common release liner 6. During labelling the release liner 6 is removed and the label is attached onto the surface to be labelled through the adhesive layer.

FIG. 2 presents an example embodiment of a laminated label structure 8 comprising four cut labels 1 attached to a common release liner 6. The label laminate may comprise a face film 2, a release liner 6 and an adhesive layer 4. The adhesive layer 4 is between the release layer 12 of the liner 6 and the face film 2. Referring to FIG. 1, the label structure may further comprise graphical patterns MRK1, such as printing (print layer). A top surface of the face film 2 may be printed. Alternatively graphical patterns may be provided by metallic or metallic like layers. The printing may be subsequently top coated in order to protect the printing. Alternatively or in addition, the reverse side of the face film adjacent to the adhesive layer 4 may be printed.

The label structure comprising the following layers: a face film, an adhesive layer and a print layer have total density less than the density of the water or the aqueous washing liquid at elevated temperatures. Print layer is to be understood to include also decorations made by, for example, metallic or metallic like layers if such decorations are used in the label. Density of the water between 60 and 90° C. may be between 0.96 and 0.98 g/cm$^3$. In an example, the label structure has total density less than 0.98 g/cm$^3$, or less than 0.96 g/cm$^3$ at the washing liquid temperature between 60 and 90° C. In an example, the label structure has total density between 0.85 and 0.98 g/cm$^3$ or between 0.85 and 0.96 g/cm$^3$. The total density of the label structure has effect on providing effective sink-float separation of the labels during recycling of the plastic bottles, such as PET bottles. It may also have effect on preventing blocking the washing equipment in the case of glass bottles.

Face Film

In an example, a face film comprises thermoplastic polymer(s). A face film comprises at least one of the following polyolefins: cyclic olefin copolymer, propylene terpolymer, propylene random copolymer, propylene homopolymer (PP), heterophasic polypropylene and linear low density polyethylene (LLDPE). The face film comprising the polyolefin(s) has density between 0.85 and 0.94 g/cm$^3$ at room temperature (25±2° C.). The density may be measured according to standard EN ISO 1183, Gravimetric density of solid and liquid materials. In one embodiment the face film has an average density in the range of 0.85-0.91 g/cm$^3$. In one embodiment the face layer has an average density in the range of 0.85-0.94 g/cm$^3$.

The face film may be transparent or clear. From the optical point of view, high transparency of the labels may be preferred. Transparent (clear) labels are substantially transparent to visible light. Transparent no label look appearance of the label is advantageous, for example, in applications where the objects beneath the label, i.e. the surface of a bottle, should be visible through the label. Clarity of the face film and a label comprising said face film can be measured and evaluated by the haze values. The haze of the face film may be lower than 25%, or lower than 10%, for example 2-6%, or 4-5%. Haze is tested according to standard ASTM D1003. When the haze of the label is low also the adhesives used should be clear or transparent.

Alternatively, the face film may be opaque and/or white. In an embodiment of an opaque face film, the face comprises additive to provide a desired colour. An additive may comprise one or more pigments or inorganic fillers, for example titanium dioxide, calcium carbonate and/or combination of those. In a multilayer film structure the pigment may be included in one or more of the layers. As an example, a black face film is provided with additive carbon black. An opaque face layer may have an opacity of at least 70%, or at least 75%, or at least 80% when measured according to the standard ISO 2471. Opacity may be 70-95%, or preferably 70-80%. Alternatively, opacity may be less than 12%, when measured according to the standard ISO 2471.

Materials for Face Films and Labels Comprising the Face Film

A face film structure may comprise at least some of the following components:

Cyclic Olefin Copolymer

The cyclic olefin copolymer(s) contain polymerized units derived from at least one cyclic and at least one acyclic olefin. The cyclic olefin may comprise at least 4 carbon atoms and a unsaturated site for coordinated polymerization with the acyclic olefin. The cyclic olefin may comprise an unsubstituted or substituted ring. The acyclic olefin may be an alpha olefin having two or more carbon atoms. Cyclic olefin copolymers may be based on cyclic monomers, such as norbornene and/or tetracyclododecene. Cyclic monomer(s) may be chain copolymerized with ethene (ethylene). For example, cyclic olefin copolymer may be comprise monomers of norbornene and ethene.

Alternatively, cyclic olefin copolymer may comprise monomers of tetracyclododecene and ethene. Cyclic olefin copolymer may also consists of monomers of norbornene, tetracyclododecene and ethene. Alternatively, cyclic olefin monomer may be at least one of the following: cyclobutene, cyclopentene, cyclooctene, 5-methylnorbornene, 3-methylnorbornene, ethylnorbornene, phenylnorbornene, dimethylnorbornene, diethylnorbornene, dicyclopentadiene, methyltetracyclododecene, 6-methylnorbornene, 6-ethylnorbornene, 6-n-butylnorbornene, 5-propylnorbornene, 1-methylnorbornene, 7-methylnorbornene, 5,6-dimethylnorbornene, 5-phenylnorbornene, 5-benzylicnorbornene, 8-methyltetracyclo-3-dodecene, 8-ethyltetracyclo-3-dodecene, 8-hexyltetracyclo-3-dodecene, 2,10-di methyltetracyclo-3-dodecene and 5,10-dimethyltetracyclo-3-dodecene. In an example, cyclic olefin copolymer may be norbornene copolymerized with ethene. It may have norbornene content between 61 and 63 wt. %. The face film may comprise cyclic olefin copolymers having different glass transition temperatures. In an example, the face film comprises first cyclic olefin copolymer $COC_1$ and second cyclic olefin copolymer $COC_2$ having different glass transition temperatures ($T_g$). In an example, face film may comprise at least two cyclic olefin copolymers comprising different glass transition temperatures in range of 30-100° C. and the difference between the glass transition temperatures being between 5 and 60° C. Glass transition temperature may be measured according to standard ISO 11357.

Cyclic olefin copolymers may have effect on the shrinking behaviour of the film. For example, a specific shrinkage curve may be achieved. The cyclic olefin copolymer in the core layer may have effect on achieving good adhesion between the core layer with skin layer(s). In addition, the cyclic olefin copolymer contained in the core layer may have effect of increasing the overall shrinkage of the film.

Propylene random copolymer is a copolymer of propylene with ethene. It may have density between 0.89 and 0.91 g/cm$^3$. The propylene random copolymer may have effect on increasing the shrinkage of the film.

Propylene homopolymer may have density of 0.900 g/cm$^3$, when measured according to standard ISO 1183. In an example, propylene homopolymer has melt flow ratio between 2 and 15 g/10 min, when measured at 230° C./2.16 kg according to standard ISO 1133. Vicat softening temperature may be between 154 and 165 degrees C. (A50 (50°

C./h 10N)), when measured according to ISO 306 standard. The propylene homopolymer may have effect on increasing the stiffness of the film.

Low density polyethylene (LDPE) refers to a branched ethylene homopolymer comprising a density range 0.91-0.94 g/cm$^3$, when measured according to standard ISO 1183. The low density polyethylene may have effect on increasing the flexibility of the film.

Linear low density polyethylene (LLDPE) refers to random copolymer of ethylene and longer chain alpha-olefins, such as butene, hexene or octene, provided by using either Ziegler-Natta catalyst or metallocene catalyst. Density of the LLDPE may be between 0.916 and 0.940 g/cm$^3$. In an example, LLDPE may be Ziegler-Natta catalyst based. For example, LLDPE may be a copolymer of ethylene and 1-octene. Density of LLDPE may be 0.916 g/cm$^3$, when measured according to standard ASTM D792. Alternatively, metallocene-catalysed LLDPE may be used. For example, ethylene-hexene copolymer having density of 0.918 g/cm$^3$. LLDPE has effect of reducing or avoiding the finger marking effect of the film. LLDPE may have effect of reducing un-wanted visual appearance, for example, due to reducing or avoiding the finger marking effect of the film. LLDPE may have an effect of providing good interlayer attachment.

Propylene terpolymer refers to copolymer(s) comprising three distinct monomers, of which one is propylene. Other monomers may be ethylene, 1-butene, 1-hexene or 1-octene. Propylene terpolymer may be at least one of the following terpolymers comprising propylene: 1-butene/propylene/ethylene, propylene/ethylene/1-hexene and propylene/ethylene/1-butene. 1-butene/propylene/ethylene terpolymer may comprise more 1-butene monomer units when compared to the propylene/ethylene/1-butene. Propylene terpolymer(s) may comprise density of 0.90 g/cm$^3$, when measured according to standard ISO 1183. The propylene terpolymer may have effect on increasing the shrinkage of the film.

Heterophasic polypropylene may also be referred to as heterophasic block copolymer and heterophasic polypropylene block copolymer. Heterophasic polypropylene include, for example, heterophasic polypropylene/propylene-ethylene copolymer(s) and heterophasic polypropylene block copolymer comprising composition of butene/ethene/propene. Heterophasic polypropylene refer to multiphase structures comprising polyolefin fraction and an elastomeric polyolefin fraction, such as ethylene propylene elastomer or ethylene-propylene-diene elastomer in polypropylene matrix. The heterophasic morphology may consist of ethylene-propylene (EP) domains (i.e. ethylene-propylene copolymer as dispersed phase) in polypropylene matrix. Heterophasic polypropylene may have density between 0.88-0.91 g/cm$^3$, when measured according to standard ISO 1183. The heterophasic polyprolylene may have effect on increasing the shrinkage of the film. It may also have effect on increasing the stiffness of the film.

The face layer may also comprise at least one of the following modifiers: copolymer of alpha-olefin and alkyl acrylate, such as ethylene butyl acrylate (EBA), olefin block copolymer (OBC), polyolefin elastomer (POE) and polyolefin plastomer (POP). The modifiers may have effect on increasing the flexibility of the film. They may also have effect on increasing the shrinkage of the film.

Ethylene butyl acrylate (EBA) may be provided by copolymerizing ethylene with at least one co-monomer, wherein the co-monomer is an alkyl acrylate ester e.g. butyl acrylate, such as n-butyl acrylate. The copolymer of ethylene and butyl acrylate may be a block or random copolymer. A preferred copolymer of ethylene and butyl acrylate may comprise in the range of 5% to 30% by weight, preferably in the range of 5 to 25% by weight, most preferably in the range of 5 to 15% or in the range of 10 to 15% by weight of butyl acrylate monomers. For example, the copolymer of ethylene and butyl acrylate may comprise a n-butyl acrylate content in the range of 5% to 30% by weight. A copolymer of ethylene and butyl acrylate may comprise a melting temperature in the range of 96° C. to 104° C., preferably in the range of 97° C. to 103° C. A copolymer of ethylene and butyl acrylate may further comprise a melt volume rate tested according to standard ISO 1133 at 190° C. with test load of 2.16 kg in the range of 0.20 to 1.5 g/10 min, preferably in the range 0.25 to 1.4 g/10 min. A preferred copolymer of ethylene and butyl acrylate may comprise a density in the range of 0.91 to 0.93 g/cm$^3$, preferably in the range 0.922 to 0.923 g/cm$^3$ according to standard ISO 1183 (Method A). A copolymer of ethylene and butyl acrylate has a large shrinkage potential when compared to other alkyl acrylate monomers, such as copolymers of ethylene and ethyl acrylate or methyl acrylate. The copolymer of ethylene and butyl acrylate may be preferred, in particular, in the core layer of the multilayer face layer structure. The copolymer of ethylene and butyl acrylate may be referred to as a olefin copolymer.

Olefin block copolymer (OBC) may be, for example, ethylene-octene block copolymer. Ethylene-octene block copolymers may be provided by chain-shuttling polymerization (dual catalyst system) resulting olefin block copolymers with alternating semicrystalline and amorphous segments. Ethylene-octene block copolymer may have density between 0.866 and 0.887 g/cm$^3$, when measured according to ASTM D792. Ethylene-octene block copolymer used as a modifier may have effect on providing better die-cutting properties of the face film.

Polyolefin elastomer and polyolefin plastomer may be polyolefin copolymers produced with a special catalyst and technology. A plastomer is a polymer that softens when heated. It hardens when cooled, but remains flexible. An elastomer is elastic polymer resembling natural rubber, returning to its original shape after being stretched or compressed. In an example, propylene-ethylene plastomers may be provided by single-site metallocene catalyst and have molecular structure different from the typical Ziegler-Natta and metallocene catalyst based copolymers of propylene. Polyolefin elastomers and plastomers may have effect on flexibility/elasticity of the face film. They may also have effect on clarity of the film.

Polyolefin plastomers and polyolefin elastomers have narrow molecular weight distribution (MWD), broad crystallinity distribution and wide melt range. Polyolefin elastomer and polyolefin plastomer may be, for example, propylene/ethylene plastomer, propylene/butene plastomer, ethylene/octene elastomer and ethylene/butene elastomer. Ethylene-butene elastomer may have density between 0.862 and 0.880 g/cm$^3$, when measured according to ASTM D792. Ethylene-octene elastomer may have density between 0.857 and 0.908 g/cm$^3$, when measured according to ASTM D792. For example, polyolefin plastomer may have a density of 0.867 g/cm$^3$. Polyolefin elastomer(s) and/or plastomer(s) may have a positive effect on the ability of the film to be stretched (oriented) and thus on the shrinkage potential of the film.

The face film may further comprise additives. Additives, such as anti-blocking agent and/or slip additive may be used for skin layer(s). Total amount of anti-blocking agent compound and/or slip additive compound may be between 0.5 and 3 wt. %. An antiblocking agent compound may comprise 10% silica in propylene polymer carrier. Propylene polymer may be either propylene homopolymer or propylene copolymer. Alternatively, the compound of anti-blocking agent may comprise synthetic silica in polyethylene carrier. An amount of anti-blocking agent in the skin layer(s) may be between 0.05 and 0.3%. Alternatively, the additive may comprise particles comprising silicone resin powder with tridimensional network. Alternatively, the additive may comprise particles comprising silicone resin powder with tridimensional network and silicone rubber powder with linear structure.

Face Film Structure

Figure 5:
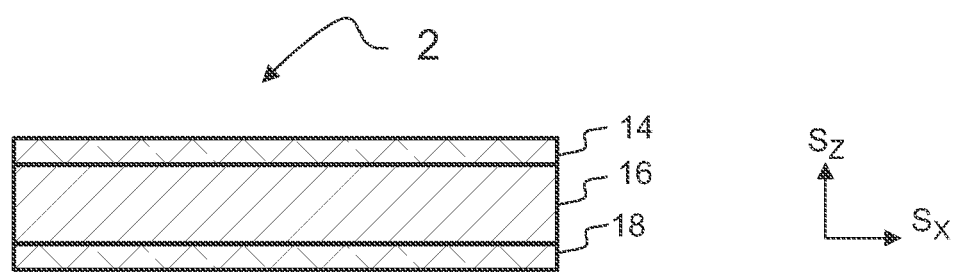
FIG. 5 shows, a multilayer face film.

The face film may have a monolayer structure. Alternatively, it may have multilayer structure comprising two or more layers. A multilayer face film may have a three layer structure. Alternatively, a multilayer face film may comprise five or even more layers. In an example and referring to FIG. 5, a multilayer face may comprise layers in the following order: a first skin layer 14, a core layer 16, a second skin layer 18. In a three layer structure, the core layer 16 is an intermediate layer. The first skin layer and the second skin layer may also be referred to as a front surface layer and a back surface layer, respectively. The front surface layer may be an outermost layer of the multilayer structure when labelled to a surface of an item. However, the front surface may further be over coated. For example, in order to protect the printed graphics. At least one surface of the face film is printable. In an example a top surface of the first skin layer. Alternatively, a second skin layer is printable and may be printed prior to applying an adhesive layer. The multilayer face film may be manufactured by co-extrusion. Alternatively, it may be manufactured by laminating.

The face film may have total thickness in the range of about 10-80 μm, for example in the range of about 20-60 μm, or 10-40 μm.

A core layer of the multilayer face film may form major portion of the multilayer face structure. The core layer may be thicker than the first skin layer and the second skin layer. For example, the core may form from 60% to 90% of the total thickness of the multilayer structure. In an example, a three layer film has a construction 10%/80%/10% for first skin/core/second skin, respectively. In an example, a three layer film has a construction 20%/60%/20% for thickness of first skin/core/second skin, respectively. In an example, a three layer film has a construction 5%/85%/10% for thickness of first skin/core/second skin, respectively.

According to an embodiment, a multilayer face film structure has a symmetric structure. For example, symmetric three layer face film comprises identical, or nearly identical skin layers on opposite sides of the core layer. Symmetric structure may have effect on shrinkability of the face film and the label comprising the face film.

Alternatively, a multilayer face film structure may be asymmetrical. For example, one skin layer may have more or less additives, e.g. anti-block or slip-agent, than the other skin layer. A face film structure may also comprise additional layers, such as tie layers or protective layers. The multilayer face film may also have asymmetry with respect to the skin layer thickness. In other words, there might be some thickness difference between the skin layers, for example in a three layer structure comprising two skin layers the skin layers may have different thickness. A multilayer structure may be laminated or coextruded.

According to an embodiment, a face film comprises at least one of the following polyolefins: cyclic olefin copolymer, propylene terpolymer, propylene random copolymer, propylene homopolymer, heterophasic polypropylene and linear low density polyethylene. The face film has density between 0.85 and 0.94 g/cm$^3$ at room temperature (23±2° C.).

According to an embodiment the face film has a multilayer structure comprising layers in the following order: a first skin layer, a core layer and a second skin layer.

In an example, a first skin layer and a second skin layer of the multilayer face film comprises at least one of the following polyolefins: cyclic olefin copolymer, propylene terpolymer, propylene random copolymer, propylene homopolymer, heterophasic polypropylene and linear low density polyethylene. The total amount of polyolefin(s) in the skin layers (first and second skin layer) may be between 80 and 99 wt. %. The first and the second skin layers of the previous examples may further comprise additives, such as anti-blocking agent and/or antioxidant.

In an example, a multilayer face film core layer comprises at least one of the following polyolefins: propylene homopolymer, propylene terpolymer, heterophasic polypropylene and propylene random copolymer; and at least one of the following modifiers: polyolefin plastomer (POP), polyolefin elastomer (POE), EBA and OBC. The amount of the polyolefin(s) of the core layer may be between 50 and 90 wt. %. The amount of the modifier(s) may be between 10 and 50 wt. %.

The total amount of polyolefin based polymer(s) (including polyolefin based modifiers) in the core layer may be at least 80 wt. %, or at least 85%. For example, between 80 and 99 wt. %, or between 85 and 99 wt. %. The amount of modifiers(s), including EBA, OBC, POP and POE, may be between 10 and 50 wt. % of the total amount of polymers. The core layer of the previous examples may further comprise additives, such as antioxidant and/or pigments, such as titanium dioxide.

At least some/all embodiments of the skin layers comprising or consisting mainly of polyolefin(s), also referred to as polyolefin based polymer(s), may have effect on providing stiffness for the face film. Skin layers may also provide shrinkability for the face film. At least some/all embodiments of the core layer comprising polyolefin based polymer (s) and between 10 and 50 wt. % of modifier(s) may have effect on providing elasticity and shrinkage capability for the face film.

Examples of the Face Films

According to a first (1$^{st}$) example the multilayer structure comprises the following structure and layers in the following order:
a first skin layer comprising cyclic olefin copolymer(s) and linear low density polyethylene,
a core layer comprising propylene terpolymer(s) and polyolefin elastomer and/or polyolefin plastomer,
a second skin layer comprising cyclic olefin copolymer(s) and linear low density polyethylene.

Amount of olefin polymers, i.e. cyclic olefin copolymer(s) and linear low density polyethylene, in the first and second skin layers may be at least 80 wt. %, for example between 80 and 99 wt. %. Amount of polyolefins i.e. propylene terpolymer(s) in the core layer may be at least 50 wt. %, for example between 50 and 90 wt. %. Amount of modifiers i.e. polyolefin elastomer and/or plastomer may be at least 10 wt. %, for example between 10 and 50 wt. %. Density of the film is between 0.85 and 0.94 g/cm$^3$. In an example, between 0.885 and 0.940 g/cm$^3$. Stretching ratio of the film in machine direction may be between 3 and 6.

According to a second (2$^{nd}$) example the multilayer structure comprises the following structure and layers in the following order:

a first skin layer comprising heterophasic polypropylene,
a core layer comprising heterophasic polypropylene and EBA,
a second skin layer comprising heterophasic polypropylene.

Amount of olefin polymers, i.e. heterophasic polypropylene, in the first and second skin layers may be at least 80 wt. %, for example between 80 and 99 wt. %. Amount of polyolefin, i.e. heterophasic polypropylene, in the core layer may be at least 50 wt. %, for example between 50 and 90 wt. %. Amount of modifier, i.e. EBA, may be at least 10 wt. %, for example between 10 and 50 wt. %. Density of the film is between 0.85 and 0.94 g/cm$^3$. In an example, between 0.89 and 0.92 g/cm$^3$. Stretching ratio of the film in machine direction may be between 4 and 8.

According to a third (3$^{rd}$) example the multilayer structure comprises the following structure and layers in the following order:
a first skin layer comprising propylene terpolymer(s),
a core layer comprising heterophasic polypropylene, propylene terpolymer and polyolefin elastomer and/or polyolefin plastomer,
a second skin layer comprising propylene terpolymer.

Amount of polyolefin(s), i.e. propylene terpolymer(s), in the first and second skin layers may be at least 80 wt. %, for example between 80 and 99 wt. %. Amount of polyolefins, i.e heterophasic polypropylene and propylene terpolymer, in the core layer may be at least 50 wt. %, for example between 50 and 90 wt. %. Amount of modifiers, i.e. polyolefin elastomer and/or polyolefin plastomer, may be at least 10 wt. %, for example between 10 and 50 wt. %. Density of the film is between 0.85 and 0.94 g/cm$^3$. In an example, between 0.87 and 0.90 g/cm$^3$. Stretching ratio of the film in machine direction may be between 4 and 8.

According to a fourth (4$^{th}$) example the multilayer structure comprises the following structure and layers in the following order:
a first skin layer comprising propylene terpolymer,
a core layer comprising propylene terpolymer(s) and polyolefin elastomer and/or polyolefin plastomer,
a second skin layer comprising propylene terpolymer.

Amount of polyolefin(s), i.e. propylene terpolymer(s), in the first and second skin layers may be at least 80 wt. %, for example between 80 and 99 wt. %. Amount of polyolefins, i.e propylene terpolymer(s), in the core layer may be at least 50 wt. %, for example between 50 and 90 wt. %. Amount of modifiers, i.e. polyolefin elastomer and/or polyolefin plastomer, may be at least 10 wt. %, for example between 10 and 50 wt. %. Density of the film is between 0.85 and 0.94 g/cm$^3$. In an example, between 0.87 and 0.91 g/cm$^3$. Stretching ratio of the film in machine direction may be between 3.5 and 7.

According to a fifth (5$^{th}$) example the multilayer structure comprises the following structure and layers in the following order:
a first skin layer comprising propylene terpolymer(s),
a core layer comprising heterophasic polypropylene and EBA,
a second skin layer comprising propylene terpolymer.

Amount of polyolefin(s), i.e. propylene terpolymer(s), in the first and second skin layers may be at least 80 wt. %, for example between 80 and 99 wt. %. Amount of polyolefins, i.e heterophasic polypropylene, in the core layer may be at least 50 wt. %, for example between 50 and 90 wt. %. Amount of modifiers, i.e. EBA, may be at least 10 wt. %, for example between 10 and 50 wt. %. Density of the film is between 0.85 and 0.94 g/cm$^3$. In an example, between 0.89 and 0.92 g/cm$^3$. Stretching ratio of the film in machine direction may be between 4 and 8.

According to a sixth (6$^{th}$) example the multilayer structure comprises the following structure and layers in the following order:
a first skin layer comprising cyclic olefin copolymer(s), and linear low density polyethylene,
a core layer comprising propylene terpolymer(s) and olefin block copolymer,
a second skin layer comprising cyclic olefin copolymer(s), and linear low density polyethylene.

Amount of polyolefin(s), i.e. cyclic olefin copolymer(s) and linear low density polyethylene, in the first and second skin layers may be at least 80 wt. %, for example between 80 and 99 wt. %. Amount of polyolefins, i.e propylene terpolymer(s), in the core layer may be at least 50 wt. %, for example between 50 and 90 wt. %. Amount of modifiers, i.e. olefin block copolymer, may be at least 10 wt. %, for example between 10 and 50 wt. %. Density of the film is between 0.85 and 0.94 g/cm$^3$. In an example, between 0.88 and 0.94 g/cm$^3$. Stretching ratio of the film in machine direction may be between 3 and 6.

According to a seventh (7$^{th}$) example the multilayer structure comprises the following structure and layers in the following order:
a first skin layer comprising heterophasic polypropylene,
a core layer comprising heterophasic polypropylene, EBA and masterbatch comprising pigment and polyethylene,
a second skin layer comprising heterophasic polypropylene.

Amount of polyolefin(s), i.e. heterophasic polypropylene, in the first and second skin layers may be at least 80 wt. %, for example between 80 and 99 wt. %. Amount of polyolefins including heterophasic polypropylene and polyethylene of the masterbatch in the core layer may be at least 50 wt. %, for example between 50 and 80 wt. %. Amount of modifiers, i.e. EBA, may be at least 10 wt. %, for example between 10 and 50 wt. %. Density of the film is between 0.85 and 0.94 g/cm$^3$. In an example, between 0.90 and 0.94 g/cm$^3$. Stretching ratio of the film in machine direction may be between 5 and 8.

According to an eighth (8$^{th}$) example the multilayer structure comprises the following structure and layers in the following order:
a first skin layer comprising heterophasic polypropylene and propylene random copolymer,
a core layer comprising heterophasic polypropylene and propylene random copolymer, EBA and masterbatch comprising pigment and polyethylene,
a second skin layer comprising heterophasic polypropylene and propylene random copolymer.

Amount of polyolefin(s), i.e. heterophasic polypropylene and propylene random copolymer, in the first and second skin layers may be at least 80 wt. %, for example between 80 and 99 wt. %. Amount of polyolefins including heterophasic polypropylene, propylene random copolymer and polyethylene of the masterbatch in the core layer may be at least 50 wt. %, for example between 50 and 80 wt. %. Amount of modifiers, i.e. EBA, may be at least 10 wt. %, for example between 10 and 50 wt. %. Density of the film is between 0.85 and 0.94 g/cm$^3$. In an example, between 0.90 and 0.94 g/cm$^3$. Stretching ratio of the film in machine direction may be between 5 and 8.

According to a ninth (9$^{th}$) example the multilayer structure comprises the following structure and layers in the following order:
a first skin layer comprising linear low density polyethylene and propylene homopolymer, a core layer comprising propylene homopolymer, masterbach comprising pigment and polyethylene, olefin block copolymer and low density polyethylene, a second skin layer comprising propylene homopolymer, olefin block copolymer and low density polyethylene.

Amount of polyolefin(s), i.e. linear low density polyethylene and propylene homopolymer, in the first and second skin layers may be at least 80 wt. %, for example between 80 and 99 wt. %. Amount of polyolefins including propylene homopolymer, low density polyethylene and polyethylene of the masterbatch in the core layer may be at least 50 wt. %, for example between 50 and 85 wt. %. Amount of modifiers, i.e. olefin block copolymer, may be at least 10 wt. %, for example between 10 and 50 wt. %. Density of the film is between 0.85 and 0.94 g/cm$^3$. In an example, between 0.88 and 0.94 g/cm$^3$. Stretching ratio of the film in machine direction may be between 5 and 8.

According to a tenth (10$^{th}$) example the multilayer structure comprises the following structure and layers in the following order:

a first layer of monoaxially oriented plastic film comprising at least one of the following polyolefins: cyclic olefin copolymer, propylene terpolymer, propylene random copolymer, propylene homopolymer, heterophasic polypropylene and linear low density polyethylene and having density between 0.85 and 0.94 g/cm$^3$ at room temperature (23±2° C.), a second layer consisting of biaxially oriented polypropylene.

The first and second layers are laminated together with a laminating adhesive layer. The first layer may be clear and the second layer may be either clear or white. In an example, the first layer may be according to one of the examples 1-6 provided in previous. Thickness of the second layer may be between 10 and 50 microns. The print layer may exist between the first layer and the second layer i.e. the first layer may be an overlaminating layer. The face film structure may have effect on providing improved scuff resistance for the label. It may further have effect on preventing the print ink bleeding into the washing solution during recycling process.

The face films according to examples 1-9 may be coextruded and further oriented at least in one direction comprising a stretching ratio between 2 and 10, or preferably between 3 and 8. In an example, the face films are uniaxially oriented in machine direction.

In the label structures comprising one of the above presented multilayer face films according to examples 1-9 the adhesive layer adhering the label to the surface of an item is adjacent to the second skin layer. In a label structure comprising the multilayer face film according to example 10 the adhesive layer is adjacent to the second layer.

In order to provide shrinkability, the face film may be oriented (stretched) at least in one direction i.e. at least uniaxially. The film may be stretched in a machine direction, in a transverse direction, or both. The resulting face film is thus monoaxially (uniaxially) oriented (MO) or biaxially oriented (BO). Monoaxially oriented face film may be machine oriented (MDO) or transverse oriented (TDO) in accordance to the direction of the orientation (stretching). In an example, the face film is oriented mainly in MD. In an example, the face film is oriented mainly in TD. Degree of orientation (stretching ratio) may be between 2 and 10 at least in one direction of the face film. An effect of the oriented face film is that the stiffness of the face layer is increased. The increased stiffness will help the converting of the label for example matrix stripping process, dispensing and feeding the labels to the items to be labelled. The oriented face film further provides shrinkage capability for the film. Orientation direction has effect e.g. on the direction of shrinkage i.e. the shrinkable face layer primarily shrinks in the orientation direction when applying external energy.

According to at least some/all embodiments the face film exhibits shrinkage in the direction of the orientation of at least 5%, at least 8%, or at least 10% at 80° C. In an example the face film according to at least some/all embodiments exhibits shrinkage in the direction of the orientation in the range of 5-40% at 80° C. In an example the face film according to at least some/all embodiments exhibits shrinkage in the direction of the orientation in less than 20% or less than 15% at 65° C. In an example the face film according to at least some/all embodiments exhibits shrinkage in the direction of the orientation less than 8% or less than 5% at 60° C. Shrinkage less than 8% or less than 5% at 60° C. may have effect on avoiding unwanted shrinkage of the labels during storage or during label converting steps, for example during printing.

Shrinkage of the label face film may have effect on capability of the label to be washed off from the surface labelled. A shrinkage capability of the face film generating forces (shrink force) providing e.g. lifting the regions of the label away from the bottle may have effect on enabling more efficient and quick removal of the label from the surface of the item attached during washing process. A shrinkage capability of the face film may also have effect on allowing removal of the label at lower washing temperatures. For example, the label comprising shrinkable face film is able to detach itself form the surface attached in a subsequent washing procedure comprising washing solution temperature of 65-90 deg C., for example washing solution having temperature of 80±2° C.

Shrinkage may be measured according to the following method: providing a sample with measured and marked 100 mm*100 mm area, placing the sample for 15 seconds to the water baths having temperatures at intervals of 5° C. from 60° C. to 100° C., cooling the sample at water bath having temperature of around room temperature, drying the sample and measuring the dimensions of the marked area of the sample. Preferably at least 3 or more parallel samples are used. Shrinkage is determined as the relative change of dimensions. The term "shrinkage" is defined with reference to the method; however, it is evident, and has been noticed, that the same shrinkage properties apply regardless of the method, provided that the same temperatures are used. I.e. the composition of heat transfer medium (air, steam, water) is not critical for shrinkage behaviour.

In the following examples of shrink stress determination test results are presented. The shrinking stress determination is based on the standard DIN 53369 as presented in previous. Three parallel samples were measured. All measured face film samples were oriented at least in one direction comprising an orientation ratio between 2 and 10. The face films comprising at least one of the following polyolefins: cyclic olefin copolymer, propylene terpolymer, propylene random copolymer, propylene homopolymer, heterophasic polypropylene and linear low density polyethylene, and exhibiting density between 0.85 and 0.94 g/cm$^3$ exhibit maximum shrink force of at least 2.0 or at least 2.3 N/15 mm at temperature of 65-90° C. in the orientation direction of the face film. The face films further exhibit no more than 50% of the maximum shrink force at temperature of 50° C. In an example, face films exhibit maximum shrinkage between 2 and 14 N/15 mm or between 2.3 and 14 N/15 mm or between 2.5 and 13.5 at the temperature range of 70-90° C. in the orientation direction of the face film. In an example, face films exhibit maximum shrinkage between 2.5 and 5.5 N/15 mm at the temperature range of 70-90° C. in the orientation direction of the face film. The maximum shrink force value at least 2.0 or at least 2.3 N/15 mm at the temperature range 65-90° C. has effect on providing detachment of the adhesive label comprising said face film from the surface of the item labelled during washing process comprising heated aqueous washing liquid. The shrinking force of the face film provides fast shrinkage and efficient removal of the labels from the containers. Maximum shrinkage of the face film being at least 2.0 or at least 2.3 N/15 mm may also have effect on providing more freedom in selecting the adhesive for the label structure. For example, permitting selection and use of adhesives providing high enough adherence at ambient temperatures towards the surface labelled. High enough adherence at ambient temperatures may, for example, prevent premature detachment of the label in hot and/or in moist storage or use conditions.

Figure 6:
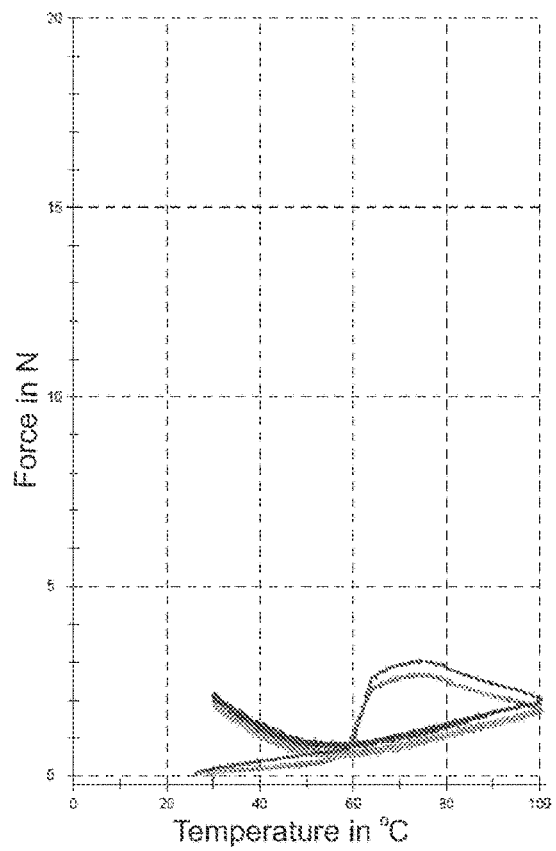
FIGS. 6-9 show, example shrink force diagrams of the face films.

Referring to FIG. 6, a shrink force diagram of the face film according to the first example is provided. The face film exhibits maximum shrinking force 2.8 N/15 mm at temperature of around 74° C. and 2.2 N/15 mm at 90° C.

Figure 7:
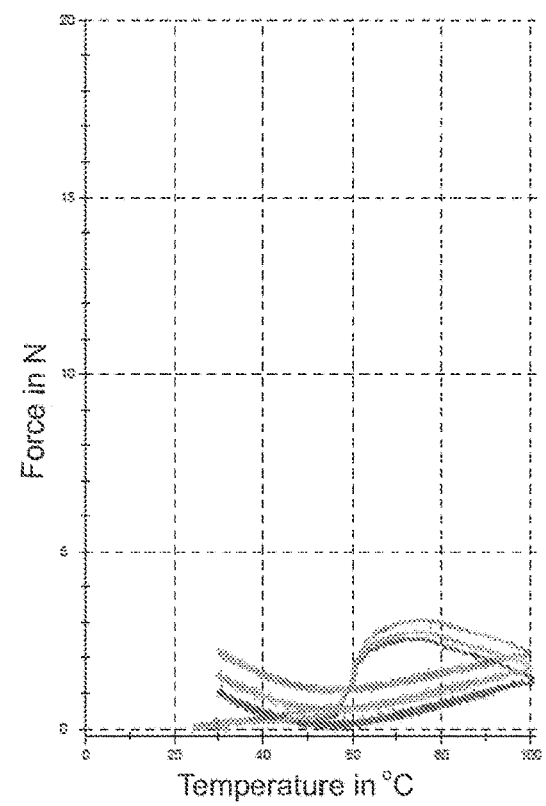

Referring to FIG. 7, a shrink force diagram of the face film according to the sixth example is provided. The face film exhibits maximum shrinking force 2.8 N/15 mm at temperature of around 75° C. and 2.3 N/15 mm at 90° C.

Figure 8:
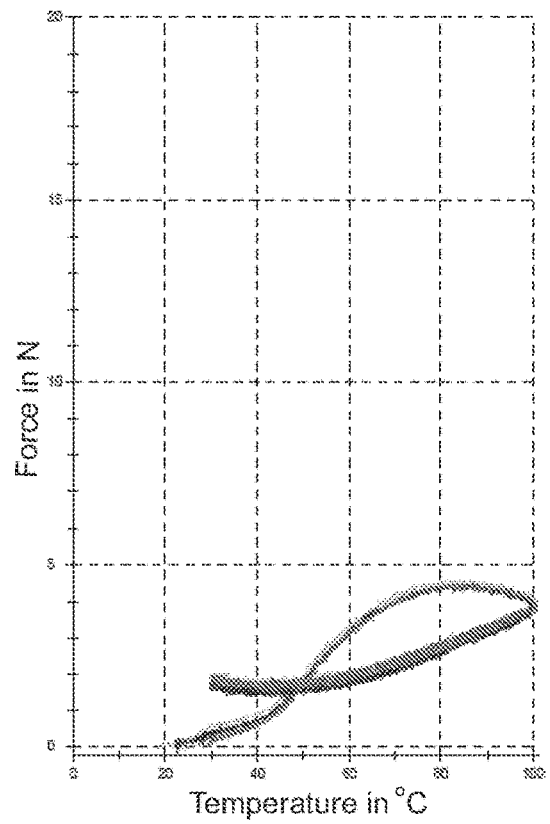

Referring to FIG. 8, a shrink force diagram of the face film according to the third example is provided. The face film exhibits maximum shrinking force 4.5 N/15 mm at temperature of around 85° C. and 4.4 N/15 mm at 90° C.

Figure 9:
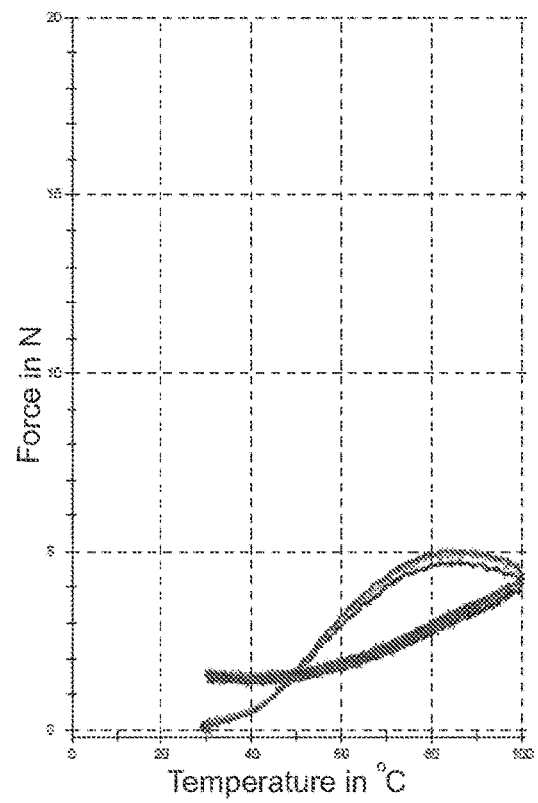

Referring to FIG. 9, a shrink force diagram of the face film according to the fourth example is provided. The face film exhibits maximum shrinking force 4.9 N/15 mm at temperature of around 87° C. and 4.8 N/15 mm at 90° C.

Further shrink force testing for the face film according to the first example presented in previous was provided. This test was performed according to the ISO 14616 standard. The test was provided in the orientation direction of the face film. In this test the shrinkage ratio refers to decrease in length of the specimen when it is brought up to the shrinkage temperature, expressed as a percentage of the initial specimen length. Shrinking force refers to force developed by the film when it reaches the temperature corresponding to that at which the stress was induced at the time of the manufacture. Contracting force refers to force developed by the film during its cooling process. A total of 10 samples were tested at six different temperature settings 50, 60, 70, 80, 90 and 98° C. The specimens of the face film were placed into the shrink force tester. The specimen connected to the force tester was rapidly brought up to the shrinking temperature and cooled to ambient temperature. The tester recorded the force and the displacement. No shrinkage was observed with the temperature setting at 50° C. nor at 60° C. Average shrinking force at 70° C. was 1.03 N (corresponding to 1.72 N/mm$^2$ and 249 psi), average contracting force 1.02 N and shrinkage ratio 20.06%. Average shrinking force at 80° C. was 1.48 N (corresponding to 2.47 N/mm$^2$ and 358 psi), average contracting force 1.09 N and shrinkage ratio 29.31%. Average shrinking force at 90° C. was 1.76 N (corresponding to 2.93 N/mm$^2$ and 425 psi), average contracting force 1.30 N and shrinkage ratio 39.80%. Average shrinking force at 98° C. was 1.70 N (corresponding to 2.83 N/mm$^2$ and 411 psi), average contracting force 3.63 N and shrinkage ratio 47.99%.

In an example the face film according to the first example presented in previous exhibits minimum value of maximum shrink force at 70 deg C. for defined surface area as per the ISO standard and in this particular case 0.6 mm$^2$ (+/−10%) of 0.83 N or 200 psi. Minimum value of maximum shrink force at 80 deg C. for defined surface area as per the ISO standard and in this particular case 0.6 mm$^2$ (+/−10%) of 1.24 N or 300 psi. Minimum value of maximum shrink force at 90 deg C. for defined surface area as per the ISO standard and in this particular case 0.6 mm$^2$ (+/−10%) of 1.65 N or 400 psi. Minimum value of maximum shrink force at 98 deg C. for defined surface area as per the ISO standard and in this particular case 0.6 mm$^2$ (+/−10%) of 1.45 N or 350 psi.

Further shrink force testing for the face films according to the 1$^{st}$ example, 3$^{rd}$ example, 4$^{th}$ example 6$^{th}$ example, 7$^{th}$ example and 8$^{th}$ example presented in previous was provided. The test was performed according to AWATM #2.1.2 method. This method measures the shrink force developed during the shrinking of plastic film when exposed to heat. The shrink force is measured by immersing weighted film samples (250 g, 200 g, 100 g and 0 g) into a heated water bath for 30 seconds and measuring length of the samples. In this test temperature of the water bath was 90° C. By extrapolating shrinkage versus weight using a regression method it is possible to calculate the weight/force results at this condition. Zero shrinkage occurs when the weight/force equals the shrinkage force.

The weight (kg), shrink force (N) and shrink stress (N/mm$^2$, psi) at zero shrinkage for the face film examples provided in previous are presented in the Table 1.

TABLE 1

| Face film sample | Weight (kg) | Shrink force (N) | Shrink stress (N/mm$^2$) | Shrink stress (psi) |
|---|---|---|---|---|
| 1$^{st}$ example | 0.296 | 2.903 | 2.9 | 421 |
| 3$^{rd}$ example | 0.499 | 4.890 | 4.9 | 711 |
| 4$^{th}$ example | 0.519 | 5.092 | 5.1 | 740 |
| 6$^{th}$ example | 0.325 | 3.190 | 3.2 | 464 |
| 7$^{th}$ example | 1.08 | 10.544 | 6.2 | 899 |
| 8$^{th}$ example | 0.92 | 9.038 | 5.1 | 738 |

The shrink stress of the films being at least uniaxially oriented and comprising at least one of the following polyolefins: cyclic olefin copolymer, propylene terpolymer, propylene random copolymer, propylene homopolymer, heterophasic polypropylene and linear low density polyethylene, and exhibiting density between 0.85 and 0.94 g/cm$^3$ at room temperature (23±2° C.) may be between 2.5 and 10 N/mm$^2$ or between 360 and 1450 psi, when measured according to AWATM #2.1.2 method at temperature of 90 degrees C. in the orientation direction of the face film.

At least some/all embodiments of the face film have positive effect in facilitating removal of the labels from the articles labelled i.e. from articles to which they are adhered to.

At least some/all embodiments of the face film have effect on providing efficient removal of the labels and separation of the labels from the PET bottles in the normal sink-float separation mechanism. In said sink-float separation the labels float and crushed pieces of the PET bottles sink to the bottom allowing easy and effective collection and recycling of the different materials, such as clean capture of the PET of the bottles which is then further processed for recycling.

Further, the density of face film being lower than the density of the washing liquid has effect on providing floating of the label in the washing process comprising washing liquid having temperature between 60 and 95° C. and the PET of the bottle to sink, thus allowing for efficient recovery and recycling of the PET flakes.

At least some/all embodiments of the face film have effect on providing sufficient mechanical properties, such as modulus and stiffness, providing efficient processing of labels in usual labelling devices and lines. For example, easy die-cuttability of the label laminate into individual labels.

At least some/all embodiments of the face films have effect on providing suitable properties, such as conformability i.e. capability of the label to conform smoothly to the contour of the article even when this is curved in two dimensions, enabling clean labelling of contoured items without wrinkles.

At least some/all embodiments of the face films have effect on providing enhanced adhesion between the core and skin layer(s) thus preventing peeling (delamination) of the multilayer face film.

Adhesive Layer

Figure 3:
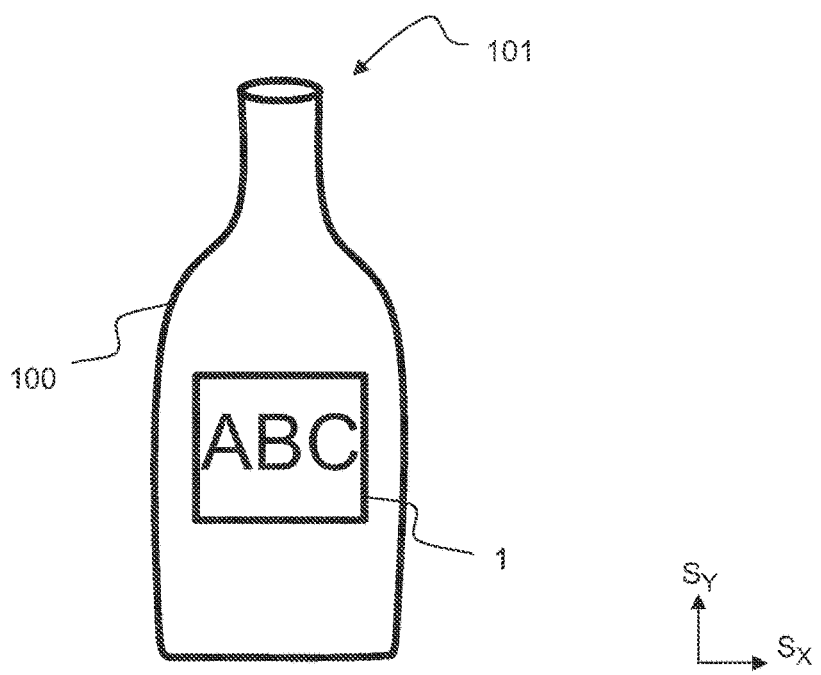
FIG. 3 shows, a label attached to an item.

Referring to FIG. 3 a label 1 can be affixed to the surface of an item (article) 100 through an adhesive layer 4 so as to form a labelled item 101. Adhesive layer provides adhesion i.e. adheres or bonds the label to the surface of the item. The adhesive layer of the label should have a suitable adhesion i.e. tack (stickiness) in order to stick to an item during labelling process. Tack is the property of adhesive that allows the immediate formation of a bond on contact with another surface. The tackiness is needed at the point the label is attached to an item. The optimum adhesion between two materials depends on, for example, the wetting and surface energy of the materials.

An adhesive layer may be a continuous coating covering 100% of the face layer surface. Alternatively, it may be applied discontinuously as spots or strips covering less than 100% of the face layer surface. For example, the adhesive may cover between 10 to 90% of the total area of the face layer. Reduced amount of adhesive may have effect on reducing the time needed for the subsequent removal of the label during washing process from the surface of the item attached.

An adhesive layer may have a thickness in the range of about 5-40 μm, or in the range of about 8-20 μm. For example, the thickness of the adhesive layer is in the range of about 5-15 μm or 5-12 μm. The amount of the adhesive layer, in dry weight, may be in the range of about 5-40 g/m², or 8-20 g/m². The amount of the adhesive may be preferably less than 15 g/m², or equal or less than 12 g/m². For example, the amount of the adhesive layer is between 5 and 15 g/m² or between 5 and 12 g/m².

According to an embodiment, an adhesive layer adjacent to the surface of the item labelled comprises or consists of a pressure sensitive adhesive(s) (PSA). The adhesive layer may comprise at least one of the following: water based (water-borne) PSA, solvent based PSA and solid PSA. In an example, the adhesive layer may comprise or consist of an acrylic adhesive, such as acrylic dispersion adhesives or acrylic UV hot-melt adhesives. Acrylic adhesive remain predominantly adhered to the film during the washing process.

Manufacturing of Labels, Labelling and Removal of Labels

A method for manufacturing labels according to embodiments may comprise at least the following steps:
providing a face film comprising at least one of the following polyolefins:
cyclic olefin copolymer, propylene terpolymer, propylene random copolymer, propylene homopolymer, heterophasic polypropylene and linear low density polyethylene, and wherein the face film has density between 0.85 and 0.94 g/cm³,
providing a release liner,
applying an adhesive layer on a face film or to a release liner,
laminating the face stock layer and the release liner together with the adhesive layer in between so as to provide a label laminate,
cutting, for example die-cutting, the label laminate structure to obtain individual labels.

Providing the face film includes providing unoriented film by using, for example extrusion process, and stretching (drawing) the extruded film to an extent several times its original dimension to orient the film. In an example, multilayer face film may be coextruded. Stretching may be designated also as orienting. The stretching may be performed by using heated draw rolls with gradually increasing speed. The stretching may be performed below the melting temperature of the polymer and/or at or near the glass transition temperature of the polymer. After stretching, the film may be cooled with one or more cooling rolls having decreasing temperature profile starting at or just below stretching temperature and decreasing gradually to around room temperature. Stretching and subsequent cooling may provide suitable shrink potential for the film. Due to the shrink potential, the oriented films are able to shrink under elevated temperature towards the non-oriented (initial) state of the film.

The face film may be uniaxially oriented approximately from 2 to 10 times, preferably 3 to 9 times, and most preferably from 3 to 8 times. The film may be uniaxially oriented in machine direction. Draw ratio (orientation ratio or stretching ratio) of the MD film is from 2 to 10 (from 2:1 to 10:1), preferably from 3 to 9 (from 3:1 to 9:1), most preferably from 3 to 8 (from 3:1 to 8:1), correspondingly. Alternatively, the film may be uniaxially oriented in transverse direction, for example, from 2 to 10 times, preferably 3 to 9 times, and most preferably from 3 to 8 times.

For example, the face film may be oriented at least 3 times at least in one direction, i.e. the draw ratio (stretching ratio) of the film is at least 3 in one direction of the film. Alternatively, the orientation ratio at least in one direction may be at least 4. For example, the draw ratio may be between 3 and 7, preferably between 4 and 6.

The coextruded and heat shrinkable multilayer face film manufactured as described above may further be combined with one or more additional film layers to provide the face film for the label. For example, the clear coextruded multilayer film may be laminated with another clear or white film, for example with biaxially oriented polypropylene film (BOPP). In this case the heat shrinkable multilayer film would serve as an overlaminating film and provide improved scuff resistance for the print trapped between the two laminated film layers. The print could be carried on the backside of the heat shrinkable multilayer film and the whiteness of the label could be provided by the other film, for example by the white BOPP film. Such overlaminated structure provides also the additional benefit that during the recycling process the print is trapped between these two filmic layers and this prevents ink-bleed into the washing liquid. The base film, such as BOPP film, may have thickness of 10-50 microns.

In manufacturing a label laminate an adhesive layer 4 may be applied onto a thermoplastic polymer layer, such as the face film 2. Alternatively, the adhesive layer 4 may be applied onto the release liner 6. Release liner and face layer are further attached (laminated) together in order to form a label laminate structure. An adhesive layer may be applied e.g. by using a curtain coating, reverse gravure, slot-die, or roller-coating methods. If water-based adhesive is used the water of the adhesive layer applied may be removed in a drying tunnel by using e.g. hot air jets or infra-red heaters.

The adhesive layer may be applied as a continuous coating covering 100% of the face surface. Alternatively, it may be applied discontinuously as spots or strips covering less than 100% of the second surface of the face. For example, the adhesive may cover between 10 to 90% of the total area of the second surface. Reduced amount of adhesive may reduce the overall label costs. Reduced amount of adhesive may also have effect on wash-off capability of the label.

During labelling the individual labels of the label laminate structure are removed from the liner and attached onto the surface of the item, such as a bottle, through the adhesive layer so as to provide labelled item. Labelling may be provided in high speed automatic labelling lines. Bottle may be, for example polyethylene terephthalate bottle or glass bottle.

Labelled items, such as bottles, are generally reused or recycled several times. The labels comprising polymeric (plastic) face layer, in contrast to the paper based, have e.g. a superior wet strength and transparency, and they can be dispensed onto the bottles and other containers in standardised machines, without a need to work with separate adhesives, as for example in the case of the wet-glue paper label. Because polymeric labels do not possess the water permeability of the paper labels, the polymeric labels may be more difficult to remove completely with the existing washing process. Thus, there is a need for an improved adhesive formulations and labels that when used in conjunction with polymer-based items would permit an efficient and cost-effective recycling process of the items.

Figure 4:
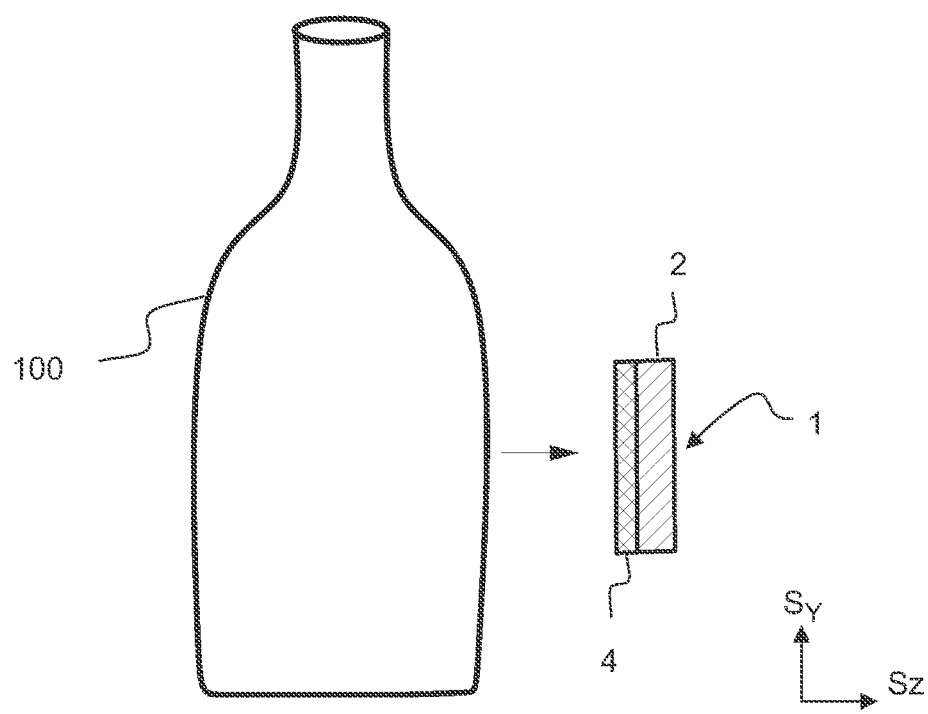
FIG. 4 shows, a label removed from the surface of an item.

Referring to FIG. 4, in the washing process the label 1 is detached from the labelled item, for example from the surface of the bottle. During washing process the label is exposed to a heated washing liquid. In washing process comprising heated aqueous washing solution, the face film comprising at least one of the following polyolefins: cyclic olefin copolymer, propylene terpolymer, propylene random copolymer, propylene homopolymer, heterophasic polypropylene and linear low density polyethylene, and the face film having density between 0.85 and 0.94 g/cm$^3$ is able to provide shrink force weakening the adhesion force of the adhesive layer thus detaching the adhesive label from the surface of the item attached. In addition, the adhesive layer 4 may lose its adhesion to at least some extent under the influence of washing conditions enabling and/or enhancing removal of the label from the surface of the item labelled. Preferably the adhesive layer does not dissolve in the washing liquid. Preferably the adhesive layer 4 is adhered to the face layer 2 after removal of the label 1 from the surface of an item 100.

The washing process may comprise an elevated temperature and an alkaline washing solution. Washing conditions of recyclable containers, such as glass containers, comprise temperatures in the range of 60-90° C. (degrees C.), or 65-85° C., or preferably at temperatures above 77° C. in aqueous solution. For polyester or plastic containers the washing temperature may be 65-75° C., or even higher such as about 80° C. Washing liquid usually comprises caustic soda, for example sodium hydroxide. The washing liquid may be 1-4%, preferably 1-2% alkaline water. In one example the labelled items go into a pre-wash chamber at 50° C. for about one minute before they go into the washing chamber at 80° C.

In a polyester bottle recycling process the labelled bottles are crushed into smaller pieces, washed in a hot caustic solution where the label is expected to detach from the polyester and float to the surface of the solution where it is removed, whilst the polyester of the bottle sinks to the bottom of the container. In this way, both label and bottle are separated and recycled.

The polyester recycling process requires that the label separates from the bottle, either in whole or in pre-crushed form, and then floats to the surface of the solution. The polyester having density of around 1.4 g/cm$^3$ conversely sinks to the bottom of the solution. In this way, for example, both the label having density below the density of the washing liquid e.g. below 1 g/cm$^3$ and the polyester can be recovered and recycled. This is not possible with labels comprising face film having density greater than the density of the washing liquid as they sink together with the polyester and cannot be separated. To achieve for the whole label structure total density clearly below the density of the washing liquid as existing in the practical washing conditions, the design and formulation of the face material is critical. Further, the lower the face film density and the face film at the same time providing good shrinking properties, the wider the possibilities to select suitable adhesive formulation and adhesive coat weight for the given end use purpose. With high enough shrinking forces provided by the face film, the adhesive can be selected to maintain its performance in hot and moist environments helping to avoid unwanted label detachment during storage, handling and end use in demanding environments.

For the person skilled in the art, it will be clear that modifications and variations of the products and the methods according to the present invention are perceivable. It should be clear that aspects of the various embodiments may be interchanged both in whole or in part. The drawings are schematic. The particular embodiments described above with reference to the accompanying drawings are illustrative only and not meant to limit the scope of the invention, which is defined by the appended claims.

The invention claimed is:

1. A wash-off label consisting of a face film and an adhesive layer comprising pressure sensitive adhesive for adhering the label to the surface of an item to be labelled, wherein the face film is at least uniaxially oriented having an orientation direction, and wherein the face film comprises at least one of the following polyolefins: cyclic olefin copolymer, propylene terpolymer, propylene random copolymer, propylene homopolymer, heterophasic polypropylene and linear low density polyethylene, and wherein the face film has density between 0.85 and 0.94 g/cm$^3$ at room temperature (23±2° C.);

wherein the face film has a multilayer structure comprising layers in the following order: a first skin layer, a core layer and a second skin layer;

wherein the core layer comprises at least one of the following polyolefins: propylene homopolymer, propylene terpolymer, heterophasic polypropylene and propylene random copolymer; and at least one of the following modifiers: propylene/ethylene plastomer, propylene/butene plastomer, polyolefin elastomer, ethylene butyl acrylate and ethylene-octene olefin block copolymer;

wherein the face film is transparent and has a haze of 2-6% when tested according to ASTM D1003;

wherein the face film exhibits less than 10% shrinkage at 60° C. in the orientation direction of the face film;

wherein the face film exhibits no more than 50% of the maximum shrink force at a temperature of 50° C.; and wherein the face film exhibits a maximum shrink force of at least 0.83 N for a defined surface area of 0.6 mm$^2$ (+/−10%) at 70° C., when measured according to standard ISO 14616 in the orientation direction of the face film.

2. The wash-off label according to claim 1, wherein the core layer has a thickness between 60 and 85% of the total thickness of the face film.

3. The wash-off label according to claim 1, wherein the total amount of the polyolefin(s) is between 50 and 90 wt. % and the total amount of the modifier(s) is between 10 and 50 wt. % in the core layer.

4. The wash-off label according to claim 1, wherein the first skin layer comprises at least one of the following polyolefins: cyclic olefin copolymer, propylene terpolymer, propylene random copolymer, propylene homopolymer, heterophasic polypropylene and linear low density polyethylene.

5. The wash-off label according to claim 4, wherein the total amount of the polyolefin(s) in the first skin layer is between 80 and 99 wt. %.

6. The wash-off label according to claim 1, wherein the second skin layer comprises at least one of the following polyolefins: cyclic olefin copolymer, propylene terpolymer, propylene random copolymer, propylene homopolymer, heterophasic polypropylene and linear low density polyethylene.

7. The wash-off label according to claim 6, wherein the total amount of the polyolefin(s) in the second skin layer is between 80 and 99 wt. %.

8. The wash-off label according to claim 1, wherein the face film exhibits shrinkage between 5 and 70% at 80° C. in the orientation direction of the face film.

9. The wash-off label according to claim 1, wherein the face film exhibits maximum shrink force of between 2 and 14 N/15 mm at temperature range of 65-90° C. in the orientation direction of the face film, when measured according to standard DIN 53369.

10. The wash-off label according to claim 1, wherein the face film exhibits a maximum shrink force of at least 1.65 N for a defined surface area of 0.6 mm$^2$ (+/−10%) at 90° C., when measured according to standard ISO 14616 in the orientation direction of the face film.

11. The wash-off label according to claim 1, wherein the face film exhibits shrink stress between 2.5 and 10 N/mm$^2$, when measured according to AWATM #2.1.2 method at temperature of 90° C. in the orientation direction of the face film.

12. The wash-off label according to claim 1, wherein the face film is uniaxially oriented in a machine direction and has a stretching ratio between 2 and 10 in the machine direction.

13. The wash-off label according to claim 1, wherein the wash-off label is detachable from the labelled surface at washing conditions comprising an alkaline aqueous solution having a temperature in the range of 60-90° C.

14. The wash-off label according to claim 13, wherein the wash-off label has a total density below the density of the alkaline aqueous solution.

15. The wash-off label according to claim 1, wherein the modifier is ethylene butyl acrylate, ethylene-octene olefin block copolymer, or a combination thereof.

16. A labelled item comprising an item and the wash-off label according to claim 1, wherein the wash-off label is attached to the surface of the item through the adhesive layer of the label.

17. The labelled item according to claim 16, wherein the item is a polyethylene terephthalate bottle.

18. A label laminate comprising the wash-off label according to claim 1 and a release liner so as to form the label laminate, and in which label laminate the adhesive layer is between the release liner and the face film.

* * * * *